United States Patent Office 3,704,323
Patented Nov. 28, 1972

3,704,323
INDANE DERIVATIVES
John Krapcho, Somerset, N.J., assignor to E. R.
Squibb & Sons, Inc., Princeton, N.J.
No Drawing. Continuation-in-part of application Ser. No.
566,729, Sept. 26, 1969. This application Dec. 23, 1969,
Ser. No. 887,723
Int. Cl. C07c 87/64
U.S. Cl. 260—576                                5 Claims

---

ABSTRACT OF THE DISCLOSURE 2-methyl-2-phenylindanamines are described. The compounds possess central nervous system stimulant activity.

---

This application is a continuation-in-part application of Ser. No. 566,729, filed Sept. 26, 1969, now abandoned.

This invention relates to new chemical compounds, and more particularly, to compounds of the Formula I:

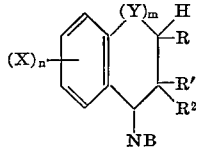

and pharmaceutically acceptable acid-addition and quaternary ammonium salts thereof, the stereoisomers and optically active forms thereof, wherein X is hydrogen, hydroxy, cyano, nitro, lower alkyl (e.g., methyl, ethyl and isopropyl), halogen (e.g., bromine, chlorine and fluorine), halomethyl (e.g., trifluoromethyl), lower alkoxy (e.g., methoxy, ethoxy, propoxy and amyloxy), benzyloxy, amino, dialkylamino (e.g., dimethylamino and diethylamino), or lower alkylthio (e.g., $CH_3CH_2CH_2S$—); Y is selected from the group consisting of —$CH_2$—, —$CH_2CH_2$—, —O—, and —S—; R is selected from the group consisting of hydrogen and lower alkyl; R' is aryl (such as X-substituted phenyl, pyridyl, thienyl and furyl); $R^2$ is selected from the group consisting of lower alkyl, cycloalkylalkylene (e.g., cyclopropylmethyl), alkene (e.g., allyl, 3,3-dimethylally); akyne (e.g., propargyl), X-substituted phenyl; X-substituted thienyl; X-substituted furyl, X-substituted pyridyl; X-substituted aralkyl (e.g., 4-chlorophenethyl); and X-substituted cinnamyl; NB is a basic nitrogen containing radical having less than twelve carbons; $n$ is 1 to 3 and $m$ is 0 to 1.

Suitable radicals represented by the symbol NB are: amino; (lower alkyl)amino; di(lower alkylamino; (hydroxylower alkyl))amino; di(hydroxylower alkyl)amino; phenyl(lower alkyl)amino; N-(lower alkyl)phenyl (lower alkyl)amino; and saturated 5- to 7-membered monocyclic heterocyclic radicals of less than twelve carbon atoms, as exemplified by piperidino; (lower alkyl)piperidino; di(lower alkyl)piperidino; (lower alkoxy)piperidino; homopiperidino; 2,3- or 4-piperidyl; 2,3- or 4-(N-lower alkylpiperidiyl); pyrrolidino; (lower alkyl)pyrrolidino; di(lower alkyl)pyrrolidino; (lower alkoxy)pyrrolidino; 2- or 3-pyrrolidyl; 2- or 3-(N-lower alkyl pyrrolidyl); morpholino; (lower alkyl)morpholino; di(lower alkyl)morpholino; lower alkoxy)morpholino; thiamorpholino; (lower alkyl)thiamorpholino; di(lower alkyl)thiamorpholino; (lower alkoxy)thiamorpholino; piperazino; 4-R-substituted piperazino (e.g., $N^4$-ethylpiperazino; $N^4$-phenylpiperazino, and so forth); [hydroxy (lower alkyl)]piperazino [e.g., $N^4$-(2-hydroxyethyl)piperazino]; (lower alkyl)piperazino (e.g., $N^4$-methylpiperazino); di(lower alkyl)piperazino; (lower alkoxy)piperazino; homopiperazino; and 4-R-substituted homopiperazino (e.g., $N^4$-benzylhomopiperazino).

The terms "lower alkyl," "lower alkoxy," and "lower alkylene," as employed herein, include both straight and branched chain radicals of less than eight carbon atoms, for example, methyl, ethyl, propyl, isopropyl, butyl, isobutyl, t-butyl, amyl, methoxy, ethoxy, propoxy, isopropoxy, ethylene, propylene, and the like.

The term "aryl" as employed herein includes mononuclear and dinuclear radicals such as X-substituted phenyl (including 3,4-methylenedioxyphenyl and 3,4-ethylenedioxyphenyl), furyl, thienyl, naphthyl or pyridyl.

As to the salts, those coming within the purview of this invention include the acid-addition salts of compounds containing a basic group. The non-toxic acid-addition salts and the quaternary ammonium salts are particularly preferred. Acids useful for preparing these acid-addition salts include, inter alia, inorganic acids, such as the hydrohalic acids (e.g., hydrochloric and hydrobromic acid), sulfuric acid, nitric acid, and phosphoric acid, and organic acids such as maleic, tartaric, citric, acetic, salicylic, succinic acid, theophylline, 8-chlorotheophyllne, benzoic, nicotinic, methanesulfonic or cyclohexanesulfamic. The quaternary ammonium salts include those formed with alkyl halides (e.g., methyl chloride, isobutyl bromide, dodecyl chloride and cetyl iodide), benzyl halides (e.g., benzyl chloride) and dilower alkyl sulfates (e.g., dimethyl sulfate).

The particularly preferred compounds of this invention are those wherein R is hydrogen, R' is phenyl, $R^2$ is lower alkyl, NB is di(lower alkyl)amino and $m$ is 0.

The compounds of this invention and the acid-addition salts thereof are therapeutically active compounds in mammals which possess central nervous system stimulant activity and hence are utilizable in the treatment of depression and also for control of obesity. Thus, the compounds of this invention can be administered perorally, the dosage for such treatment being from about 0.25 mg. per kg. of body weight to about 1.0 mg. per kg. of body weight.

The compounds of this invention are prepared by the process of this invention which comprises reacting a compound fo the Formula II:

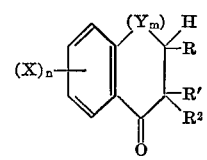

wherein X, Y, R', $R^2$, $R^3$, $n$ and $m$ are as hereinbefore defined with hydroxylamine in the presence of an organic solvent such as pyridine to yield the corresponding 1-oxime derivative. This reaction is generally carried out at temperatures of from ambient to reflux conditions, but preferably, at from about 70° to 135° C. The oxime is then reduced, as by known treatment as with hydrogen in the presence of a hydrogenation catalyst such as Raney nickel to yield the corresponding 1-amino intermediate derivative. This intermediate is then reacted with an acid halide to give an amide that is reduced to yield a monosubstituted amine. The amide of this invention may be reduced by known methods as by treating it with lithium aluminum hydride. This process may be repeated to form the disubstituted amine of the invention.

Examples of acid halides that may be utilized in the practice of the invention are acyl halide, e.g., acetyl chloride; phenylacetyl bromide, benzoyl bromide, propargyl chloride, and so forth.

The product wherein NB is

may be prepared by reacting the 1-amino intermediate with a mixture of formaldehyde and formic acid. Alternatively the mono-methyl product of the instant invention, i.e., wherein NB is

is obtained by reacting the intermediate 1-amino compound with formic acid and then reducing the amido compound formed by treating it with lithium aluminum hydride.

To form the NB cyclic compounds of this invention, a dihalide, e.g., the dibromo or dichloroform, is utilized as the reagent to react with the 1-amino derivative. This reaction takes place in the presence of sodamide. When, for example, 1,4-dibromobutane; 1,5-dibromopentane; bis(2-chloroethyl)ether; bis(2-chloroethyl)sulfide; or N-methylbis(2-chloroethyl)amine are utilized, the corresponding pyrrolidino; piperidino; morpholino; thiomorpholino; and methylpiperizino, respectively, are formed.

The following examples are illustrative of the invention. All temperatures are in degrees centigrade, unless otherwise stated:

EXAMPLE 1

N,N,2-trimethyl-2-phenyl-1-indanamine, hydrochloride (A) 2-methyl-2-phenyl-1-indanone, oximes.—A solution of 176.0 g. (0.79 mole) of 2-methyl-2-phenyl-1-indanone in 800 ml. of pyridine is warmed to 70° and treated with 120 g. (1.72 mole) of hydroxylamine hydrochloride and the resulting solution then refluxed for four hours. The solvent is removed under reduced pressure; the residue cooled and treated with 1.2 l. of ether and a solution of 60 ml. of concentrated hydrochloric acid in 300 ml. of water. The aqueous phase is discarded and the organic phase washed with 100 ml. of water (twice). After drying over magnesium sulfate, the solvent is evaporated and the semi-solid residue (188 g.) is digested with 500 ml. of hot hexane. The mixture is cooled and filtered to give 117.0 g. (94%) of colorless oxime, M.P. 110–113° (turbid melt which cleared at 140°). This mixture of syn/anti oximes is used in the reaction below.

(B) 2-methyl-2-phenyl-1-indanamine, hydrochloride.—A suspension of 23.7 g. (0.1 mole) of the above oxime in 150 ml. of warm ethanol is treated with a suspension of pyrophoric Raney nickel and the mixture reduced in the Parr apparatus under 55 pounds of hydrogen at 50–55°. The uptake of hydrogen is complete after one hour. After standing overnight, the mixture is filtered and the filtrate from six runs are combined and concentrated under reduced pressure to give 135.3 g. of residue. The latter is dissolved in 200 ml. of chloroform and treated with 82 ml. of 7.4 N alcoholic hydrogen chloride. The resulting solution is diluted to about 1.4 l. with ether to give a crystalline product weighing 148.7 g. (95%); M.P. 256–264°. This mixture of isomers is used in the subsequent reaction.

(C) N,N,2-trimethyl-2-phenyl-1-indanamine.—A suspension of 26.0 g. (0.1 mole) of the above hydrochloride in 200 ml. of water is treated with a solution of 6 g. of sodium hydroxide in 20 ml. of water and the liberated base extracted with 200 ml. portions of ether (three times). After drying the combined ether phases over magnesium sulfate, the solvent is removed under reduced pressure to give 21.6 g. of residue. The latter is treated with 26 ml. of 88% formic acid, cooled and the resulting solid mass treated with 26 ml. of 37% formaldehyde. After the initial vigorous evolution of carbon dioxide subsides, the mixture is gently refluxed for sixteen hours and cooled. Concentrated hydrochloric acid (10 ml.) is added to the solution and the major portion of the solvent is removed under reduced pressure (2 mm.). The syrupy residue (34.5 g.) is dissolved in 20 ml. of water and treated with a solution of 10.0 g. of sodium hydroxide in 20 ml. of water. The liberated base is extracted 100 ml. of ether (three times) and the solvent evaporated to give 23.2 g. (92%) of the base, M.P. 68–77°. Crystallization from 40 ml. of hexane gives 14.8 g. of colorless material, M.P. 78–80°.

Analysis.—Calc'd for $C_{18}H_{21}N$ (percent): N, 5.57. Found (percent): N, 5.65.

Concentration of the above hexane filtrate gives 7.9 g. of solid. After crystallization from 10 ml. of 95% alcohol, the material weighs 4.3 g., M.P. 77–80°. The NMR spectra is the same as that of the above material (14.8 g.). Total yield of crystalline base is 19.1 g. (82%).

(D) Isomer of N,N,2-trimethyl-2-phenyl-1-indanamine, hydrochloride.—A solution of 14.6 g. of the base in 25 ml. of ethanol and 25 ml. of ether is treated with 8.0 ml. of 7.4 N alcoholic hydrogen chloride. Since dilution of this solution with ether gives an oil, the solvent is removed under reduced pressure and the residue triturated with 300 ml. of ether. The resulting gummy product slowly becomes a granular solid weighing 16.3 g. (80%); M.P. 162–171°. After crystallization from 150 ml. of butanone, the colorless solid weighs 11.2 g. (55%); M.P. 175–177°.

Analysis.—Calc'd for $C_{18}H_{21}N \cdot HCl$ (percent): Cl, 12.32; N, 4.87. Found (percent): Cl, 12.12; N, 4.77.

The NMR spectra indicates that this material is a pure isomer of N,N,2-trimethyl-2-phenyl-1-indanamine, hydrochloride.

EXAMPLE 2

2-methyl-2-phenyl-N-propyl-1-indanamine (A) Preparation of N-(2-methyl-2-phenylindan-1-yl) propionamide.—A solution of 20.0 g. of 2-methyl-2-phenyl-1-indanamine from part C of Example 1 in 100 ml. of benzene is added to a stirred solution of 9.0 g. of propionyl chloride in 200° while maintaining the temperature at 5–10°. The mixture is stirred for one hour at room temperature and then refluxed for one hour. After cooling, the mixture is treated with 50 ml. of water and 200 ml. of ether and shaken. The phase is dried over magnesium sulfate, filtered and the solvent removed under reduced pressure to yield the product.

(B) Preparation of 2-methyl-2-phenyl-N-propyl-1-indanamine.—A solution of the product from part A in dry tetrahydrofuran is added to a solution of 8.0 g. of lithium aluminum hydride in 300 ml. of tetrahydrofuran and the resulting mixture is refluxed for eight hours. The solution is cooled, treated dropwise with 10 ml. of water and then with a solution of 6 g. of sodium hydroxide in 40 ml. of water. The mixture is stirred for two hours at room temperature, filtered and the solid washed with ether. The filtrate is concentrated under reduced pressure to give the product.

EXAMPLE 3

N,N-dipropyl-2-methyl-2-phenyl-1-indanamine (A) Preparation of N-(2-methyl-2-phenylindan-1-yl)-N-propylpropionamide.—Equivalent quantities of material from Part B of Example 2 and propionyl chloride are reacted in accordance with the procedure described in Part A of Example 2, the desired product is obtained.

(B) Preparation of N,N-dipropyl-2-methyl-2-phenyl-1-indanamine.—Treatment of the material from Part A with lithium aluminum hydride according to the procedure described in Part B of Example 2, the product is obtained.

EXAMPLE 4

1-methyl-4-(2-methyl-2-phenylindan-1-yl)piperazine

Equivalent quantities of the 2-methyl-2-phenyl-1-indanamine from Part C of Example 1 and N-methyl-bis(2-chloroethyl)amine in toluene and excess of sodium carbonate is refluxed for eight hours, cooled and treated with 100 ml. of water. The organic phase is dried over magnesium sulfate, filtered and the filtrate concentrated under reduced pressure to give the product.

If the procedure of Example 1 is followed but in lieu of 2-methyl-2-phenylindanone, the reactants utilized are molar equivalents of 2,3-dimethyl-2-phenyl-1-indanone;
6-butoxy-3-hexyl-2-phenethyl-2-(p-chlorophenyl)-1-indanone;
5-phenoxy-2-pyridyl-2-benzyl-1-indanone;
4-hydroxy-2-(m-methoxyphenyl)-2-(2-pyridylethyl)-1-indanone;
2-thienyl-2-cyclopropylmethyl-1-indanone;
2-furyl-2-ethyl-1-indanone;
2-hexyl-2-phenyl-1-indanone;
5-methylthio-2-phenyl-2-propargyl-1-indanone;
6-nitro-2-methyl-2-phenyl-1-indanone and
5,5-dimethylamino-2-butyl-2-phenyl-1-indanone;
2-methyl-2-phenyl-1-tetralone;
2-methyl-2-(p-fluorophenyl)-1-tetralone;
2-benzyl-2-phenyl-1-tetralone;
2-methyl-2-phenyl-1-benzosuberanone;
2-methyl-2-phenyl-1-chromanone and
2-methyl-2-phenyl-1-thiochromanone, the products formed are the hydrochloric salt of N,N,2,3-tetramethyl-2-phenyl-1-indanamine;
N,N-dimethyl-6-butoxy-3-hexyl-2-phenethyl-2-(p-chlorophenyl)-1-indanamine;
N,N-dimethyl-5-phenoxy-2-pyridyl-2-benzyl-1-indanamine;
N,N-dimethyl-5-hydroxy-2-m-methoxyphenyl-2-(2-pyridylethyl)-1-indanamine;
N,N-dimethyl-2-thienyl-2-cyclopropylmethyl-1-indanamine;
N,N-dimethyl-2-furyl-2-ethyl-1-indanamine;
N,N-dimethyl-6-nitro-2-methyl-2-phenyl-1-in-danamine;
N,N-dimethyl-6-nitro-2-methyl-2-phenyl-1-indanamine;
N,N-dimethyl-5,5-dimethylamino-2-butyl-2-phenyl-1-indanamine;
N,N,2-trimethyl-2-phenyl-1-naphthylamine;
N,N,2-trimethyl-2-(p-fluorophenyl)-1-naphthylamine;
N,N-dimethyl-2-benzyl-2-phenyl-1-naphthylamine;
N,N,2-trimethyl-2-phenyl-1-benzosuberanylamine;
N,N,2-trimethyl-2-phenyl-1-chromanylamine;
N,N,2-trimethyl-2-phenyl-1-thiochromanylamine.

EXAMPLE 5

1-(2-methyl-2-phenylindan-1-yl)pyrrolidine

Following the procedure of Example 4 but utilizing a molar equivalent of 1,4-dibromobutane in lieu of (2-chloroethyl)amine the desired product is obtained.

EXAMPLE 6

1-(2-methyl-2-phenylindan-1-yl)piperidine

Following the procedure of Example 4 but utilizing a molar equivalent of 1,5-dibromopentane in lieu of N-methyl-bis(2-chloroethyl)amine, the desired product is obtained.

EXAMPLE 7

1-(2-methyl-2-phenylindan-1-yl)morpholine

Following the procedure of Example 4 but utilizing a molar equivalent of bis(2-chloroethyl)ether in lieu of N-methyl-bis(2-chloroethyl)amine, the desired product is obtained.

EXAMPLE 8

N,2-dimethyl-2-phenyl-1-indanamine, hydrochloride

A suspension of 13.0 g. of material from part B of Example 1 in 50 ml. of 98% formic acid is treated with 3.5 g. of sodium formate, the mixture is heated and the resulting solution refluxed for a period of twenty hours.

About 40 ml. of the formic acid is then distilled, the residue is cooled and poured into 100 ml. of the water. The product is extracted with 100 ml. of ether (three times), the ether phases are combined, washed with 15 ml. of water (three times) and dried over magnesium sulfate. After evaporation of the solvent, the intermediate formyl compound weighs 10.2 g. A solution of this material in 100 ml. of dry tetrahydrofuran is added dropwise to a solution of 4 g. of lithium aluminum hydride and the resulting solution refluxed for eight hours. The mixture is then cooled and treated dropwise with 5 ml. of water, followed by a solution of 3 g. of sodium hydroxide in 20 ml. of water. After stirring for two hours, the mixture is filtered and the solid washed well with ether. The filtrate is dried over magnesium sulfate, filtered and the solvent evaporated to give 7.47 g. of residue. The latter is dissolved in 10 ml. of ethanol and treated with 4.3 ml. of 7.4 N alcoholic hydrogen chloride. Dilution of this solution with 300 ml. of ether gives 7.1 g. of the hydrochloride salt, M.P. 223–232°. This material is purified by crystallization from ethanol.

The invention may be variously otherwise embodied within the scope of the appended claims.

What is claimed is:

1. A compound having the formula

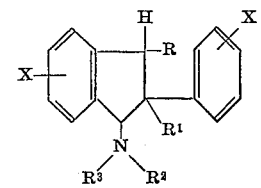

wherein R is selected from the group consisting of hydrogen and lower alkyl; $R^1$ is selected from the group consisting of lower alkyl, x-phenyl and x-phenylmethyl; X is selected from the group consisting of hydrogen, lower alkyl, lower alkoxy, halogen and halomethyl; and $R^2$ and $R^3$ are selected from the group consisting of hydrogen, lower alkyl, hydroxylower alkyl, phenyl and lower alkylphenyl and pharmaceutically acceptable salts thereof.

2. A compound in accordance with the formula of claim 1 having the name N,N,2-trimethyl-2-phenyl-1-inoanamine, hydrochloride.

3. A compound in accordance with the formula of claim 1 having the name 2-methyl-2-phenyl-N-propyl-1-indanamine.

4. A compound in accordance with the formula of claim 1 having the name N,N-dipropyl-2-methyl-2-phenyl-1-indanamine.

5. A compound in accordance with the formula of claim 1 having the name N,2-dimethyl-2-phenyl-1-indanamine, hydrochloride.

References Cited

UNITED STATES PATENTS 3,253,037  5/1966  Huebner et al. _____ 260—576
3,347,870  10/1967  Rutschmann _____ 260—576
3,419,560  12/1968  Bernstein et al. _____ 260—253

FOREIGN PATENTS 1,094,255  12/1960  Germany _____ 260—576

ALEX MAZEL, Primary Examiner

A. M. T. TIGHE, Assistant Examiner

U.S. Cl. X.R.

260—240 K, 247, 247.1, 247.5 B, 247.7 A, 253, 268 BC, 293.57, 293.58, 293.62, 294.8 C, 294.9, 295.5 B, 296 B, 326.8